United States Patent [19]

Kaufman

[11] 4,257,091
[45] Mar. 17, 1981

[54] ELECTRICAL POWER CONVERTER THYRISTOR FIRING CIRCUIT HAVING NOISE IMMUNITY

[76] Inventor: Lance R. Kaufman, 131 White Oak Way, Mequon, Wis. 53092

[21] Appl. No.: 962,584

[22] Filed: Nov. 21, 1978

[51] Int. Cl.³ .......................................... H02P 13/24
[52] U.S. Cl. ..................................... 363/85; 363/128; 323/326; 323/902
[58] Field of Search ............................ 363/39, 44–46, 363/50, 54, 57, 85–86, 88, 128, 138; 323/21, 24, 22 SC; 307/311, 252 Q, 252 L

[56] References Cited

U.S. PATENT DOCUMENTS

| | | | |
|---|---|---|---|
| 3,675,110 | 7/1972 | Kelley, Jr. | 363/50 |
| 3,710,230 | 1/1973 | VeNard | 363/138 |
| 3,890,561 | 6/1975 | Demarest | 307/311 X |
| 4,039,863 | 8/1977 | Ohhinata et al. | 307/311 X |
| 4,058,696 | 11/1977 | Antier et al. | 363/57 X |
| 4,129,791 | 12/1978 | Sato | 307/311 X |
| 4,161,022 | 7/1979 | Kanazawa et al. | 363/88 |

OTHER PUBLICATIONS

Korn et al., "Photon Couplers", GE Application Notes, No. 200.62, Jun. 1972, pp. 13–21.

*Primary Examiner*—William M. Shoop
*Assistant Examiner*—Peter S. Wong
*Attorney, Agent, or Firm*—Andrus, Sceales, Starke & Sawall

[57] ABSTRACT

A power control circuit has a thyristor bridge interposed between a.c. buses connected to an a.c. power supply and a load. The firing circuit for the thyristors of the bridge includes a light actuated controlled rectifier for generating firing pulses. Two series connected resistor-capacitor pairs are connected in series across the a.c. buses. Taps intermediate the resistors and capacitors provide an energizing anode voltage to the controlled rectifier reduced with respect to the a.c. voltage in the buses. The voltage reducing and capacitive properties of the pairs render operation of the controlled rectifier immune to transient voltage spikes in the a.c. buses.

6 Claims, 5 Drawing Figures

ELECTRICAL POWER CONVERTER THYRISTOR FIRING CIRCUIT HAVING NOISE IMMUNITY

BACKGROUND AND SUMMARY OF THE PRESENT INVENTION

The present invention relates to a thyristor firing circuit utilizing a light actuated silicon controlled rectifier which has improved immunity to electrical noise.

Thyristors are commonly used to control the power supplied to a load from an a.c. source as by connecting the thyristors in an intermediate bridge.

Recent developments in optoelectronic devices, such as light emitting diode—light actuated silicon controlled rectifier packages have made their use highly advantageous in thyristor firing circuitry. These advantages include complete isolation between the power and control circuits, precise control of firing, small physical size and others. However, the silicon controlled rectifier of such light coupled devices is subject to spurious operation responsive to the application of transient voltages having a high rate of change to the anode-cathode circuit. Such voltage spikes or surges typically characterize electrical noise in the a.c. lines.

It is therefore, the object of the present invention to provide an improved light actuated silicon controlled rectifier thyristor firing circuit having improved immunity to noise.

Briefly, the present invention is utilized in a power control circuit having at least one thyristor with its power circuit connected to a load and to a.c. buses energized by an a.c. power source. A firing circuit for the thyristor includes a light actuated controlled rectifier providing firing pulses to the photo sensitive area of the thyristor. A resistor-capacitor circuit, connected across the buses, provides a voltage reduced with respect to the voltage in the buses for application to the anode of the SCR as an energizing voltage. The voltage reducing and capacitance properties of the resistor-capacitor circuit suppress transient voltage spikes in the a.c. buses, thereby rendering the operation of the controlled rectifier immune to such phenomena. The resistor-capacitor circuit typically includes two series connected resistor-capacitor pairs, each of the pairs being connected in series with each other across the a.c. buses.

DETAILED DESCRIPTION OF THE PREFERRED EMBODIMENT

Figure 1:
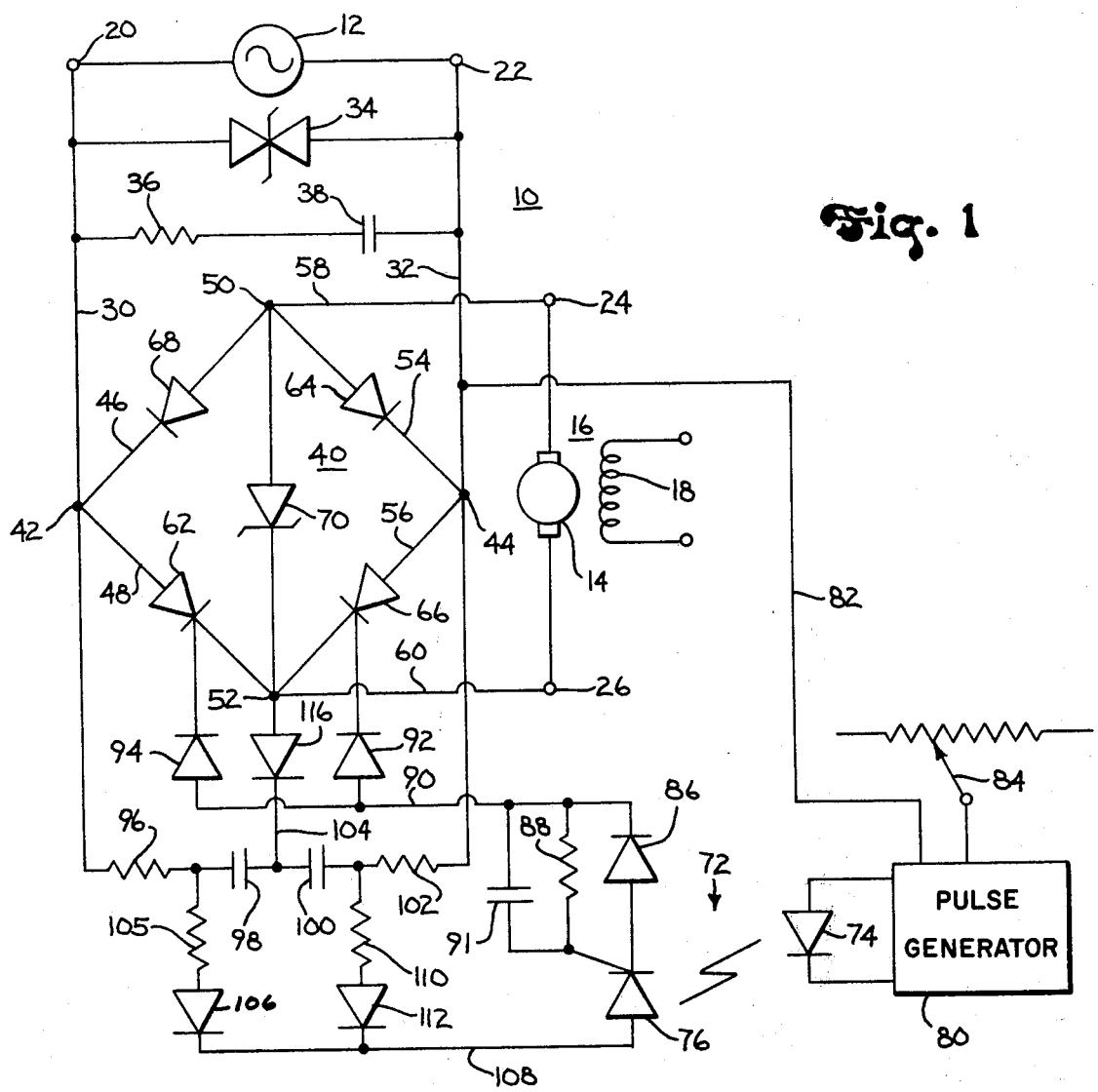
FIG. 1 is a schematic diagram of power control circuitry incorporating the improved firing circuit of the present invention.

FIG. 1 shows an a.c. to d.c. converter 10. The converter is shown as interposed between alternating current power supply 12 of, for example, 110 or 220 volt, 60 Hz power and the armature 14 of d.c. motor 16 having separately excited field 18. Converter 10 includes a pair of input terminals 20, and 22, connected to a.c. power source 12 and a pair of d.c. output terminals 24 and 26 connected to armature 14. A.c. input terminals 20 and 22 are also connected to a.c. buses 30 and 32.

A varistor 34 and a series connected resistor 36 and capacitor 38 are connected across buses 30 and 32 for suppressing line transients.

A bridge circuit 40 is also connected across buses 30 and 32 at terminals 42 and 44. Bridge arm connectors 46 and 48 connect terminal 42 with terminals 50 and 52, respectively. Bridge arm connectors 54 and 56 connect terminal 44 with terminals 50 and 52, respectively. The d.c. output is taken from terminals 50 and 52 in conductors 58 and 60. Full wave rectification of the alternating current at output terminals 20 and 22 is obtained by thyristor 62 and diode 64 and thyristor 66 and diode 68. A Zener diode 70 is connected across terminals 50 and 52 and provides a path for the inductive energy of armature 14, insuring that desired control of thyristors 62 and 66 can be obtained. The Zener diode 70 suppresses inductive spikes generated by the electromotive means 16 to semi-conductors 62 and 66 and the diodes 64 and 68.

Thyristors 62 and 66 are fired by a photon coupled isolator 72 comprised of light emitting diode 74 and light actuated silicon controlled rectifier 76. The light emitting diode, when energized, emits light which, when applied to a photon-sensitive area of the silicon controlled rectifier renders the latter conductive. The units are typically provided in a single package and conventional photon coupled isolators are suitable for use in the present invention. It will be appreciated that discrete components may be used, if desired, and that the term "light" includes visible, infra-red, or ultraviolet light, or other suitable portions of the electro-magnetic spectrum.

As previously noted, while providing good isolation and other advantages, such light actuated silicon controlled rectifiers are prone to uncontrolled conduction by voltage spikes or surges typically characterizing electrical noise applied to the anode of the controlled rectifier. Such uncontrolled conduction is particularly acute where small photo sensitive SCR's are employed and the voltage drop across the silicon controlled rectifier is held within confined constraints. In such construction, the silicon controlled rectifier is very sensitive to foreign influences such as noise or the like.

Light emitting diode 74 may be energized by a pulse generator 80, synchronized to the alternating current in buses 30 and 32 by conductor 82. The point of energization of light emitting diode in each half cycle of the alternating current may be determined by the magnitude of a control signal supplied to pulse generator 80, such as that supplied from rheostat 84. The pulse generator 80 may also be coupled to sense other operating conditions of the motor 16 or converter 10 to develop a precise firing control signal for actuating the light emitting diode 74.

A diode 86 is connected in series with the cathode of light actuated silicon controlled rectifier 76 to provide thermal compensation for the controlled rectifier. A parallel connected resistor 88 and capacitor 91 serve to desensitize or clamp the gate-cathode circuit of controlled rectifier 76. A higher resistance for resistor 88 renders the controlled rectifier 76 more sensitive to light while the capacitor 91 operates to suppress noise. The firing signals for thyristors 62 and 66 are conducted to the respective gate circuits through conductor 90 and diodes 92 and 94.

A resistor-capacitor circuit operatively resists or "snubs" rapid changes in voltage and is connected to the anode of controlled rectifier 76 to protect against uncontrolled conduction of the controlled rectifier. This circuit includes resistor 96, capacitor 98, capacitor 100, and resistor 102 connected in series across buses 30 and 32. Conductor 104, containing diode 116, extends from the junction of the capacitors 98 and 100 to the terminal 52 of bridge 40. Resistor 105 and diode 106 are connected in series between the conductor 108 and a tap intermediate resistor 96 and capacitor 98. Resistor 110 and diode 112 are connected in series between the conductor 108 and a tap intermediate capacitor 100 and resistor 102. Conductor 108 is connected to the anode of controlled rectifier 76. In effect, capacitor 100 and resistor 102 are connected across the anode-cathode circuit of controlled rectifier 66 through diode 116 while capacitor 98 and resistor 96 are connected across the anode-cathode circuit of controlled rectifier 62 through diode 116.

In operation, buses 30 and 32 are energized with alternating current from source 12. The presence of alternating current in buses 30 and 32 causes capacitors 98 and 100 to charge. The capacitance of capacitors 98 and 100 is selected so that the maximum voltage obtainable on the capacitors is low as compared to the voltage in buses 30 and 32. The diode 116 in conductor 104 maintains the charge on capacitors 98 and 100.

The most positive voltage on capacitors 98 and 100 appears in conductor 108, with the diode 106 or 112 connected to the least positive capacitor voltage being reversed biased. The voltage in conductor 108 is applied to the anode of controlled rectifier 76 and serves to apply a firing pulse to thyristors 62 and 66 when controlled rectifier 76 is rendered conductive by light emitting diode 74. The firing pulses are provided to both thyristors 62 and 66 but only one of the thyristors will be properly biased by the alternating current in buses 30 and 32 for conduction.

Should a transient voltage spike appear in a.c. buses 30 and 32, the capacitance of capacitors 98 and 100 together with the resistance of resistors 96 and 102 reduces or "snubs" the rate of change of the voltage in conductor 108 to prevent undesired or premature firing of controlled rectifier 76. Further, the magnitude of any such voltage spike is reduced by the snubbing circuit at approximately the same rate that the a.c. voltage in buses 30 and 32 is reduced, rendering it harmless to controlled rectifier 76.

Figure 2:
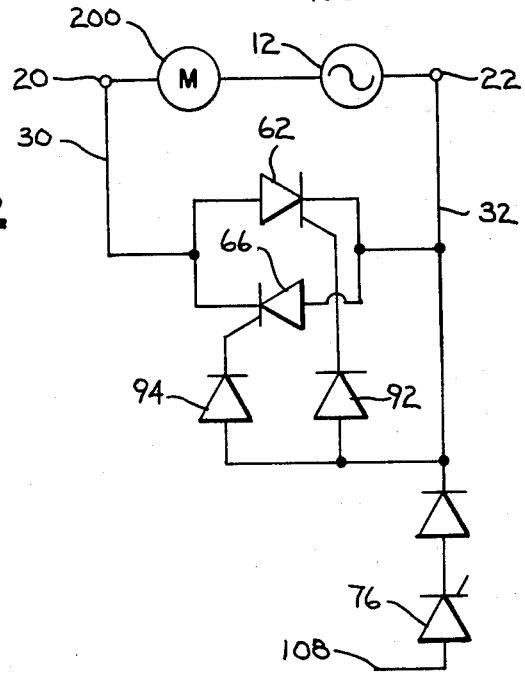
FIG. 2 is a schematic diagram of a modified embodiment of the power control circuitry.

While circuitry 10 has been shown and described in use in an a.c. to d.c. converter, it will be appreciated that it may be used in an a.c. power control circuit, such as that shown in FIG. 2 in which oppositely poled thyristors 62 and 66 are connected in parallel across buses 30 and 32 to provide a.c. power to an a.c. load. The a.c. load such as induction motor 200 is connected in series with the a.c. source 12 across terminals 20 and 22.

Various modes of carrying out the invention are contemplated as being within the scope of the following claims, particularly pointing out and distinctly claiming the subject matter which is regarded as the invention.

I claim:

1. In a power control circuit having a pair of buses connectable to an a.c. power source and having at least one controllable current conduction means having a power circuit and a firing signal responsive control circuit including a controlled gatable rectifier having an anode circuit and a cathode circuit for conducting controlled amounts of energy to a load, said power circuit being connected to said a.c. buses for receiving the alternating current, an improved firing circuit comprising: a light activated silicon controlled rectifier having an anode and a cathode coupled to said control circuit for providing firing signals to said control circuit; light means for activating said silicon controlled rectifier; resistive-capacitive means comprising at least one series connected resistor and capacitor pair connected across said a.c. buses and having a tap intermediate said resistor and capacitor connected to said anode of said controlled rectifier for providing a voltage that is reduced with respect to the voltage in said buses to said anode for providing firing signals when said controlled rectifier is activated while rendering said firing circuit immune to transient voltage spikes in said a.c. buses, and diode means electrically connecting said capacitor to said cathode circuit of said control circuit to maintain the charge at said capacitor.

2. The firing circuit according to claim 1 wherein said resistive—capacitive means includes two pairs of series connected resistors and capacitors, said pairs being connected in series with each other across said a.c. buses.

3. The firing circuit according to claim 2 wherein said each of said pairs includes a tap intermediate the resistor and capacitor and wherein the anode of said controlled rectifier is coupled to said taps.

4. The firing circuit according to claim 3 wherein said taps are connected in parallel to said anode and wherein a diode is interposed between each of said taps and said anode.

5. The firing circuit of claim 2, wherein said controllable current conduction means includes a full wave rectification bridge circuit with a pair of legs each containing a silicon controlled rectifier having a gate circuit electrically connected to an output provided by said light activated silicon controlled rectifier, with said pairs of series connected resistors and capacitors electrically connected across said silicon controlled rectifiers within said bridge legs.

6. The firing circuit according to claim 5, wherein said diode means includes a diode interconnecting the common connection of the bridge circuit legs and the common connection of said resistor-capacitor pairs.

* * * * *